United States Patent [19]

Ainsworth et al.

[11] Patent Number: 5,278,538

[45] Date of Patent: Jan. 11, 1994

[54] BICYCLE SECURITY SYSTEM

[76] Inventors: Kathryn L. Ainsworth, 70 Manchuria Road, London, England SW11, England; Mark B. Beezer, P.O. Box 31, Jamestown, R.I. 02835

[21] Appl. No.: 871,112

[22] Filed: Apr. 20, 1992

[51] Int. Cl.⁵ .................. B60R 25/10; B62H 5/00; B62J 3/00
[52] U.S. Cl. .................. 340/427; 340/432; 340/542; 340/825.33; 235/382; 307/10.5; 180/287; 70/235; 211/5; 379/49
[58] Field of Search .............. 340/427, 432, 309.15, 340/542, 543, 825.31, 825.32, 825.34, 825.33; 235/380–382, 377; 194/902, 205; 70/235, 233; 211/5; 248/551, 553; 307/10.5, 10.2; 364/406; 379/37, 39, 40, 49; 180/287

[56] References Cited

U.S. PATENT DOCUMENTS

| | | | |
|---|---|---|---|
| 4,727,368 | 2/1988 | Larson et al. | 340/825.31 |
| 4,830,167 | 5/1989 | Lassche | 70/235 |
| 4,891,503 | 1/1990 | Jewell | 340/825.33 |
| 4,920,334 | 4/1990 | DeVolpi | 340/568 |
| 4,939,352 | 7/1990 | Sunyich | 235/382 |

*Primary Examiner*—Donnie L. Crosland
*Attorney, Agent, or Firm*—Salter, Michaelson & Benson

[57] ABSTRACT

A bicycle security system includes a locking bicycle rack and employs a user's automated teller banking card to operate the system and debit charges accrued in connection with use of the system from the user's bank account. The locking system has an electronic control means which locks and unlocks the bicycle rack by means of a banking card. The electronic control means includes a timer which tracks time in connection with use of the system. The control means thereafter calculates a charge based upon the use of the system and debits the accrued charges from the user's bank account via telephone modem. The locking bicycle rack incorporates three locking pins which lock the bicycle at the frame, the front wheel and the rear wheel to provide a high degree of security.

14 Claims, 4 Drawing Sheets

BICYCLE SECURITY SYSTEM

BACKGROUND OF THE INVENTION

The instant invention relates to bicycle racks and more specifically is directed to a bicycle security system which employs a user's automated teller banking card to operate the system and debit accrued charges to the user's bank account.

It has been found that declining economic conditions have forced many people in both the United States and Europe to turn to alternative forms of transportation, such as bicycles, for both business and pleasure. It has also been found that an increasing sophistication in bicycle designs has caused a significant increase in the cost of bicycles over the past several years. The combination of increasing popularity and increasing price has thus made the bicycle a high profile target for thieves. Accordingly, it has been found that there is a growing number of commuter cyclists, in both metropolitan and suburban areas, who lock up their bicycles in public areas, such as outside their place of employment or outside of the city's rapid transit stations.

Heretofore, there have been known several locking bicycle racks which have been operated by various means. For example, U.S. Pat. No. 4,433,787 issued to Cook et al discloses a locking bicycle rack which is coin-operated. In the Cook disclosure, the user deposits a preset number of coins to unlock the mechanism and locks his/her bike in the rack. The rack is thereafter unlocked by a key-operated lock which captures the key when the rack is unoccupied. Although several types of locking bicycle racks have been available, none of the coin-operated racks has gained widespread acceptance either among cyclists or providers of the racks. One reason the cyclists have not accepted the available racks is that none have provided the ease of use, reliability or security required by today's bicycle owners. Cyclists still tend toward using chain and lock combinations which can be transported with their bicycle even though the chain and lock may be heavy and cumbersome. Cyclists also find it inconvenient to carry around the correct change in order to utilize coin-operated racks. It has thus been determined that cyclists prefer the convenience and security offered by a transportable locking means over the existing locking bicycle racks.

Another reason the racks have not been accepted is that they are highly susceptible to vandalism and misuse. Both the owners of the bicycle racks and the cyclists are wary of the coin-operated racks because of the possibility of vandalism. Often times the coin-operated locking mechanisms are vandalized in order to steal a secured bicycle, or broken into to steal money from the coin box. Bicycle rack owners often spend more money maintaining the racks than they collect from them and thus the racks become a financial liability rather than a profitable investment. It has also been found that cyclists often misuse the racks by locking up their bicycles for lengthy periods of time. Since a predetermined number of coins opens the rack for use, a person using the rack for one hour pays the same amount as a person using the rack for one day or one week. In this regard, the owner of the rack is left with no viable way to collect extra charges from long term users. The heretofore available bicycle racks have thus been found to be inadequate in these regards.

SUMMARY OF THE INVENTION

The instant invention provides a bicycle security system which employs a user's banking card to operate the system and to debit accrued charges to the user's bank account.

Specifically, the system of the present invention comprises a rack adapted to receive a bicycle, with locking means for securely retaining the bicycle. However, the locking means are not operable until the bank card of the user has been entered into and verified by the system. Once this has happened the locking means may be operated to securely maintain the bicycle locked to the rack. When the user returns and once again enters his or her bank card, the locking means is released so that the bicycle may be removed from the rack. At the same time, the system calculates the length of time the bicycle has been parked, as well as the charges based on the elapsed time, which charge is automatically debited to the user's account.

It is therefore an object of the instant invention to provide a bicycle security system which employs a user's banking card to operate the system and to debit accrued charges to the user's bank account.

It is another object of the instant invention to provide a highly secure locking bicycle rack which deters vandalism and theft.

It is yet another object to provide a bicycle security system which is easy to use.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
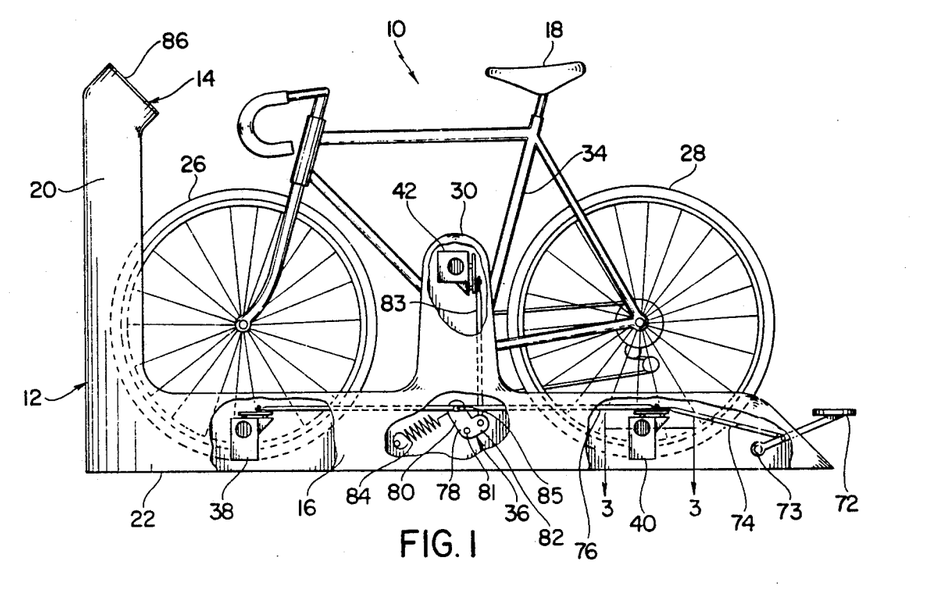
FIG. 1 is a side elevational view of the bicycle security system of the instant invention with portions broken away for purposes of illustration.

Referring now to the drawings, and particularly to FIG. 1, the bicycle security system of the instant invention is illustrated and is generally indicated at 10. Generally described, the bicycle security system 10 comprises a locking bicycle rack generally indicated at 12, and electronic control means generally indicated at 14 which employs a user's banking card to operate the system 10 and debit accrued charges to the user's bank account.

Figure 2:
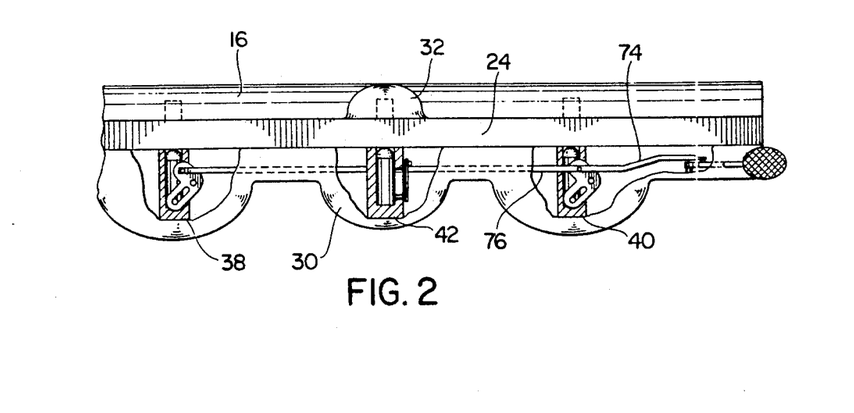
FIG. 2 is a fragmentary plan view of the locking mechanism thereof with portions broken away for purposes of illustration.

Referring now to FIGS. 1 and 2, the bicycle rack 12 is preferably formed from a rugged, durable material, such as a metallic alloy, and comprises an elongated base portion 16 and a meter head portion 20. The base portion 16 is adapted for receiving a bicycle 18 thereon and has a substantially flat bottom 22 which is suitable for resting on a flat surface, such as a parking lot or a sidewalk. Any suitable means, not shown, may be used to secure the base portion to its supporting surface. The base portion 16 includes a recessed tire channel 24 which extends lengthwise along the top surface of the base portion 16 and which is adapted for receiving the front and rear wheels 26 and 28, respectively, of the bicycle 18. The base portion further includes a pair of spaced posts 30 and 32 which extend upwardly from the center of the base 16 on opposing sides of the tire channel 24 and which are adapted to receive the frame 34 of the bicycle 18 therebetween for supporting said frame. Housed within the base portion 16 is a three-point locking mechanism which is generally indicated at 36. The meter head portion 20 extends upwardly from the front end of the base portion 16 and houses the control means 14.

The locking mechanism 36 generally comprises three electromagnetically controlled locking assemblies 38, 40 and 42 and a system of connecting rods which interconnect the locking assemblies. Two of the locking assemblies 38 and 40 are mounted within the base portion 16 adjacent to the tire channel 24 and are operable for locking the bicycle 18 at the front wheel 26 and the rear wheel 28, respectively, within the tire channel 24. The third locking assembly 42 is mounted within the post 30 and is operable for locking the bicycle 18 at the frame 34 thereof.

Figure 3:
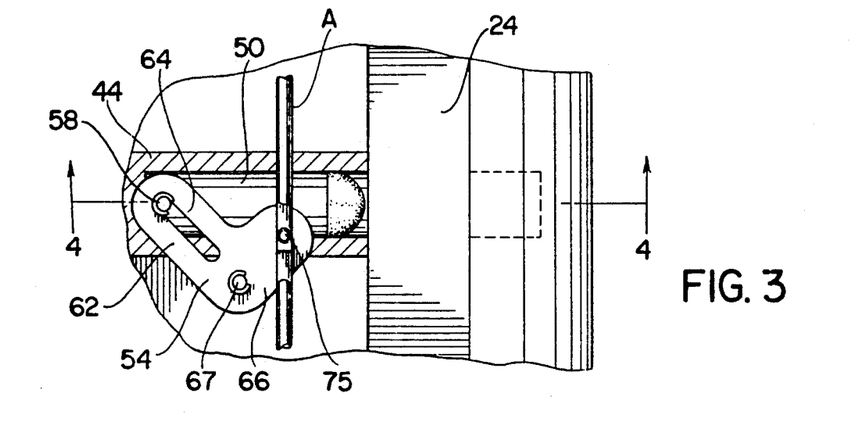
FIG. 3 is an enlarged sectional view of the locking mechanism taken along line 3—3 of FIG. 1 showing the locking pin in retracted inoperative position.
Figure 4:
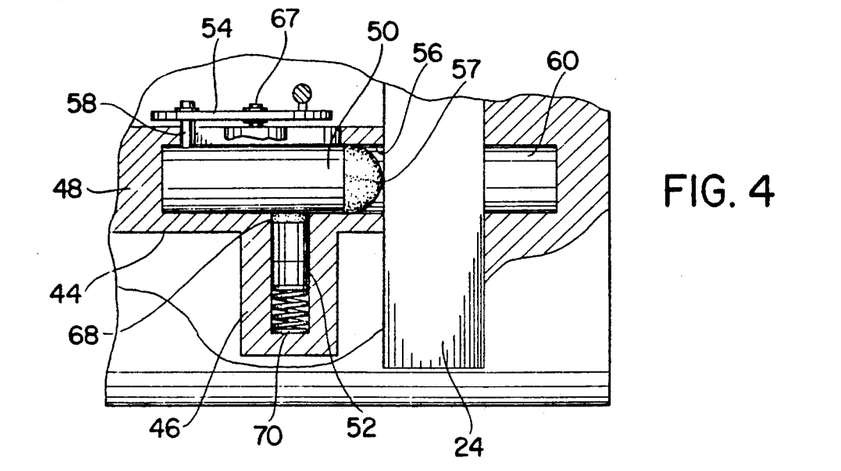
FIG. 4 is a sectional view of the locking mechanism taken along line 4—4 of FIG. 3.
Figure 5:
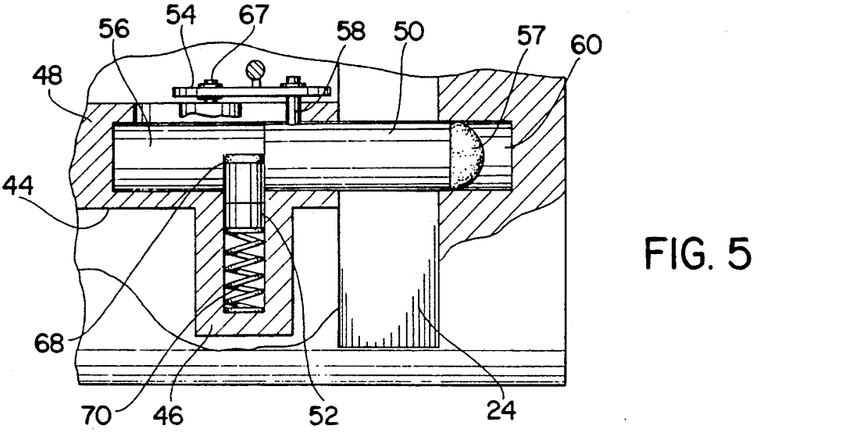
FIG. 5 is a sectional view similar to FIG. 4 showing the locking pin in extended locking position.

Referring now to FIGS. 3, 4 and 5, each of the locking assemblies comprises a generally T-shaped housing 44 having an upright portion 46 and a cross portion 48, a locking pin 50, a locking bolt 52, and an L-shaped actuator lever or bell crank 54.

The locking pin 50 is preferably formed from a durable material, such as stainless steel, and is slidingly received within an open bore 56 in the cross portion 48 of the housing 44. The locking pin 50 preferably has a teflon tip portion 57 so as not to scratch the wheel rims and spokes, and includes an actuator pin 58 which projects outwardly from the pin 50 and extends outwardly of the housing 44 through a longitudinal slot (not shown) in the top of the housing 44. The bore 56 is located adjacent to the tire channel 24 and the locking pin 50 is slidingly received therein so that it can slide from the retracted, inoperative position of FIGS. 3 and 4 to the extended locking position of FIG. 5 across the tire channel 24, through the adjacent bicycle wheel and into an aligned locking bore 60 located on the opposing side of the tire channel 24. With regard to the locking assembly 42 located in the post 30, the aligned locking bore 60 is located within the opposing post 32. In this manner, the locking assemblies 38, 40, and 42 are operative for securely retaining the front wheel 26, the rear wheel 28 and the frame 34 of the bicycle 18 within the base 16.

The actuator lever 54 comprises an elongated leg portion 62 having an elongated slot 64 formed therein and a substantially perpendicular short leg portion 66. The actuator lever 54 is mounted on top of the housing 44 by a pivot pin 67 such that the elongated slot 64 is in sliding communication with the actuator pin 58 for actuating the locking pin 50 when the lever 54 is pivoted. The terminal end of the short leg portion 66 of the lever 54 is attached to one of the connecting rods A to pivot the lever. The actuator lever 54 is operable for sliding the locking pin 50 between the retracted inoperable position as in FIGS. 3 and 4, and the operable locking position as seen in FIG. 5, wherein the locking pin 50 extends across the tire channel 24 through the wheel of the bicycle located therein and into the aligned locking bore 60.

The locking bolt 52 is preferably formed from a durable material, such as stainless steel, and is slidingly mounted within a bore 68 in the upright portion 46 of the housing 44. The bore 68 is perpendicular to bore 56 and is in communication therewith, and the locking bolt 52 is biased upwardly within the bore 68 by a coil spring 70. Electromagnetic means, not shown, retain the locking bolt 52 in a downward position within bore 68 (FIG. 4) against the bias of spring 70 when energized, or in the alternative, the bolt 52 may actually be the plunger of the electromagnet. On the other hand, when the electromagnetic means is deenergized, locking bolt 52 moves upwardly pursuant to the bias of spring 70. Thus, when locking pin 50 has moved to the operative locking position shown in FIG. 5, bolt 52 engages behind the rear extremity of pin 50 to lock the latter in its extended operative position. When the electromagnetic means is again energized, bolt 52 will again be retracted into bore 68, thus releasing pin 50 for movement back to its retracted unlocked position (FIGS. 3 and 4).

Referring again to FIGS. 1 and 2, the locking assemblies 38, 40 and 42 are actuated simultaneously by an actuator pedal 72 which is pivotally mounted within the rear end of the base 16 as at 73. The actuator pedal 72 and the locking assemblies 38, 40 and 42 are interconnected by a series of connecting rods which are connected to the short legs 66 of the actuator levers 54 as at 75 (FIG. 3). The actuator pedal 72 is connected to locking assembly 40 by an angled bar 74 and locking assemblies 40 and 38 are interconnected by rod 76. Located between the locking assemblies 38 and 40 is an L-shaped transfer lever 78 which has a long leg 80 and a short leg 82 and which is pivotally mounted within the base 16 as at 81. The terminal end of the long leg 80 is connected to the rod 76 as at 85 such that when the rod 76 is actuated by depressing pedal 72, the lever 78 pivots. The locking assembly 42 is connected to the short leg 82 of the transfer lever 78 by transfer rod 83 which transmits rotary movement to the lever 54 located at locking assembly 42. The locking assemblies 38, 40 and 42 are normally biased to their inoperative unlocked position, i.e., locking pin 50 retracted, by a coil spring 84 which is anchored within the base 16 and attached to the long leg 80 of the transfer lever 78 (FIG. 1). The system of connecting rods is operative such that when the actuator pedal is depressed against the bias of spring 84, the rods 74, 76, and 83 pivot the actuator levers 54 to in turn move the locking pins 50 to their operative locking position.

Figure 6:
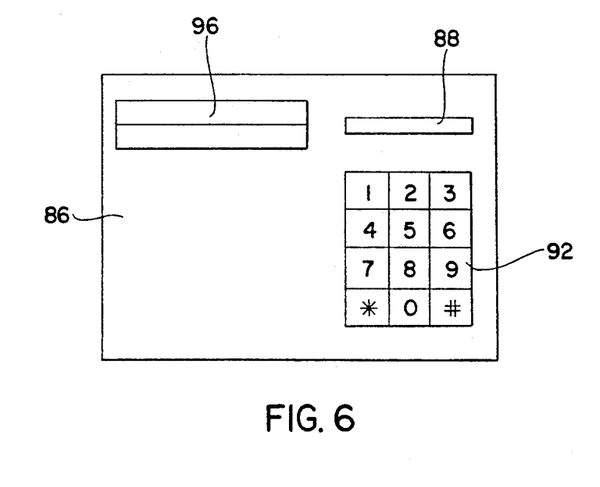
FIG. 6 is plan view of the control panel thereof.
Figure 7:
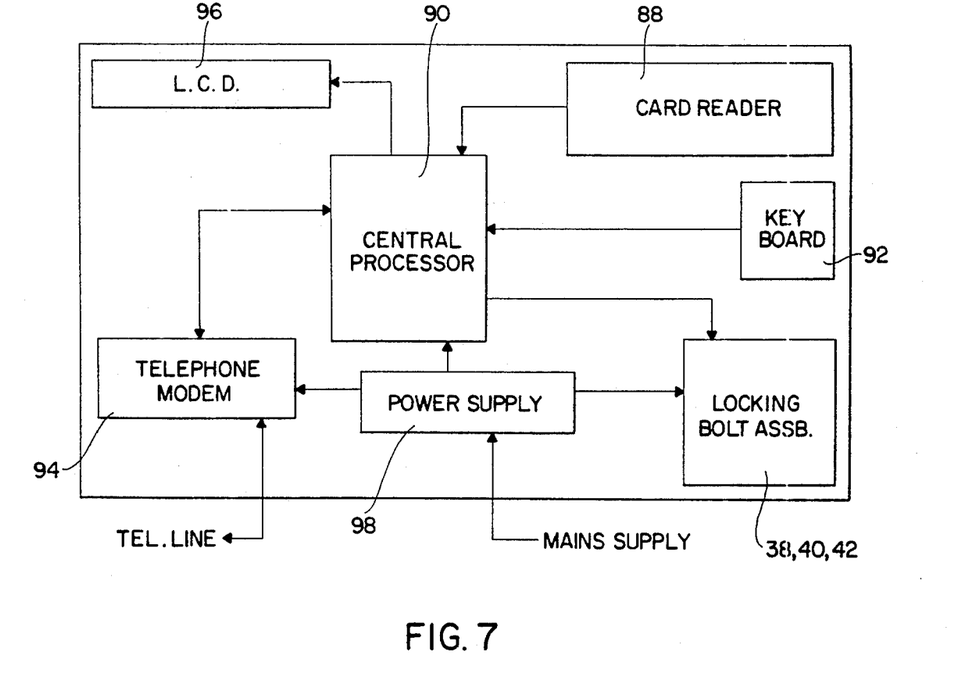
FIG. 7 is a block diagram showing the components of the system and their connections to the central processing unit thereof.

Referring now to FIGS. 6 and 7, the control means 14 is housed within the meter head portion 20 of the bicycle rack 12 and comprises a magnetic card reader 88, such as a "Verifone" type, a central processor 90, such as a Philips 87C524 processor chip or the equivalent, a standard alpha-numeric keypad 92, a telephone modem 94, such as a "Verifone" type, and a liquid crystal display (LCD) 96, such as a Philips LTA342 or the equivalent.

Referring particularly to FIG. 7, the electronic interconnections between the elements of the control means 14 is clearly seen. A power supply 98 is provided and communicates with the central processor 90, the telephone modem 94 and the electromagnetic means associated with locking assemblies 38, 40 and 42. The power supply 98 is in turn connected to a mains power supply. It is contemplated that the security system will have an internal backup power supply in the event of a power failure. The backup power system will enable the system to continue tracking time during a power failure and to maintain security until the power is restored. The telephone modem 94 is also connected to a telephone line for dialing into various bank's computers. It is contemplated that various banks will become members of a bicycle security system network and the various member banks will permit access to their computers by the system modems. The card reader 88, the keypad 92, the LCD 96, and the telephone modem 94 are all tied into the central processor 90 and the central processor is tied into the locking assemblies 38, 40, and 42 respectively to complete the connections.

The magnetic card reader 88 is operable for reading information, including a bank account number and a personal identification number (PIN), from a user's banking card. The central processor 90 is specifically programmed to interface with the card reader 88 and the keypad 92, and is operable for processing and storing the bank account number and PIN code and also for activating and deactivating the electromagnetic locking assemblies. The central processor 90 includes a timer means for tracking time in connection with a user's operation of the system 10 and is further operable for calculating a charge based upon the measured time of operation. The keypad 92 is operable for inputting information into the central processor 90 and the LCD 96 is operable for displaying information. The telephone modem 94 is operable for dialing into a bank's computer, accessing the user's bank account and directly debiting the accrued charge to the account. The control means 14 is operated by a user by means of a control panel 86 located on the top of the meter head 20. As seen in FIG. 6, the control panel comprises the card reader 88, the keypad 92 and the liquid crystal display 96.

Figure 8:
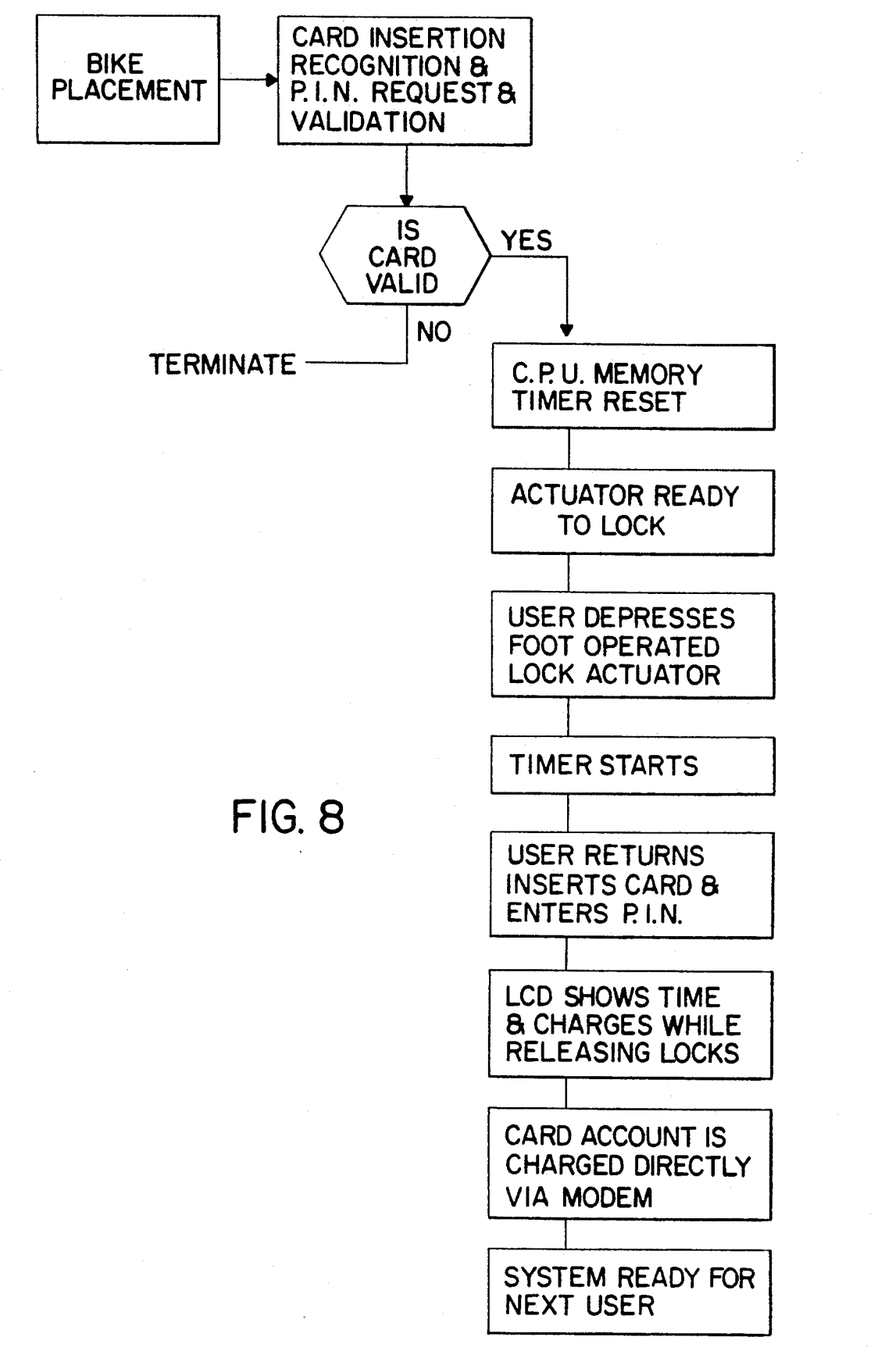
FIG. 8 is a flow chart of the operation of the instant invention.

Referring now to FIG. 8, a standard operating sequence of the system 10 is illustrated in the form of a flow chart. In operation, a cyclist who wishes to utilize the bicycle security system 10, places his/her bicycle on the base of the rack and inserts his/her banking card into the card reader 88 to activate operation. The card reader 88 reads the bank account number and the corresponding PIN code from a magnetic strip that is conventionally present on the back of the banking card and forwards the information to the central processor 90 which then issues a request, via the LCD 96 for the user to input the PIN code for the banking card. The user thereafter inputs the PIN code to the central processor 90 via the keypad 92, and upon a determination of validity of the PIN code, the central processor stores the bank account number and the PIN code and deactivates the electromagnets of locking assemblies 38, 40 and 42, thereby conditioning the locking means for operation. If the banking card or personal identification number is invalid, the system will terminate the operating sequence and return the banking card to the user. It is contemplated that the central processor will be programmed to withhold invalid banking cards or banking cards that are utilized without the correct personal identification number. The central processor 90 stores the account information for reference and matching when the user returns to the system to retrieve his/her bicycle and, in this regard, only the same card will be able to release the system 10 and unlock the bicycle 18. The user thereafter depresses the actuator pedal 72 to move the locking pins 50 of the locking assemblies 38, 40 and 42 to their operative locking position. After the card has been verified, the central processor 90 automatically starts its timer to track time in connection with the use of the system 10, and the rods 74, 76, and 83, pursuant to depression of the actuator pedal 72, move the locking pins 50 into their locking position, i.e. extended into the aligned locking bore 60. At this point, the released locking bolts 52 are biased upwardly into latching position behind the locking pins 50, thereby blocking the return of the locking pins 50. The bicycle 18 is now fully secured within the system 10 and the card reader 88 has already returned the user's card. The user is thereafter free to leave his/her bicycle and go about their business for as long as desired. While the user is gone, the central processor tracks the amount of time elapsed until the user returns to retrieve his/her bicycle.

Upon returning to retrieve his/her bicycle, the user again inserts his/her banking card into the card reader 88 and inputs the corresponding PIN code via the keypad 92. The central processor 90 then compares the input information to the stored information and, upon verification of a match of the information, stops the timer and reactivates the electromagnetic locks, thus retracting the locking bolts 52 into their respective bores 68. At this point, the locking pins 50, which are normally biased to their retracted inoperative positions, automatically return to said inoperative position by the action of coil spring 84 thus releasing the bicycle for removal from the system 10. The central processor thereafter calculates a charge based on the time of operation, displays the time and charges on the LCD, and then debits the charges to the user's bank account via the telephone modem 94. The telephone modem 94 is connected to public telephone lines and is operative for dialing into the computer of any bank which honors their banking cards in the bicycle security system.

It is contemplated that the described bicycle security system will be available in all public places, such as shopping centers, train stations and downtown business districts. The base 16 of the system is adaptable for being secured to a concrete or asphalt surface and public power and telephone hook-ups will be provided for each system. The bicycle security systems could be located individually or combined together for locking a plurality of bicycles in a central location. It is also contemplated that one control system will be operable for controlling a plurality of bicycle security locks. In this regard, a single base having a plurality of bicycle stalls will be provided, and a single control system will operate all the stalls, although in such a situation, each individual stall or space would have a number that would be punched in, preferably at the same time the PIN number is punched, so that only that particular space or stall would be controlled by the system.

It is seen therefore that the instant invention provides an effective bicycle security system which offers a high degree of security and ease of operation. The security system, which employs a multi-point electromagnetic locking mechanism which is specially designed to lock the bicycle to the base at least at three point s, provides a high degree of security and deters vandalism. The control means employs a user's banking card to operate the system and is specifically adapted to be easily usable by all persons. The banking card control means debits accrued charges directly to the user's bank account and eliminates the need for carrying the correct change when using metered bicycle racks. Cyclists who carry a banking card will now be able to access their money and a means for securing their transportation by one simple method. For these reasons, it is believed that the bicycle security system of the instant invention represents a significant advancement in the bicycle rack art.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A bicycle security system comprising:
   a locking bicycle rack having support means for receiving a bicycle thereon;
   locking means movable between a locked and unlocked position for securing said bicycle to said rack; and
   control means for controlling said locking means, said control means being operative in response to insertion into the system of a user's bank card, whereby insertion of said bank card conditions said locking means for movement to said locked position, and subsequent re-insertion of said bank card permits movement of said locking means to said unlocked position;
   said control means having timer means for recording a length of time said bicycle is locked, and central processor means for calculating a charge based on the recorded time, and for automatically debiting said charge to a bank account corresponding to said bank card.

2. In the bicycle securing system of claim 1, said control means further comprising:
   card reader means for reading information from said banking card, said information including a bank account number and a corresponding personal identification number to permit verification of said card;
   input means for inputting information to said central processor means;
   telephone modem means for communicating with a bank's computer system; and
   display means for requesting and displaying information;
   whereby when a user inserts said bank card into said card reader and inputs said personal identification number via said input means, said central processor means processes said information to determine validity of said card, and thereafter, upon determination of validity, stores said information and conditions said locking means for movement to locked position to secure the bicycle to said rack in response to which said timer means becomes operative, and wherein subsequent re-insertion of said card into said card-reader means repeats the aforesaid verification process, and if found to be valid, deactivates said timer means, calculates a charge based on the elapsed recorded time, displays said time and charge via said display means, moves said locking means to said unlocked position and debits said charge to the user's bank account via said modem means.

3. In the bicycle security system of claim 1, biasing means normally urging said locking means to said unlocked position, manually controlled means for moving said locking means to said locking position in opposition to said biasing means, and electromagnetically controlled means for retaining said locking means in said locked position, said electromagnet means being operable in response to insertion of the user's bank card into the system.

4. In the bicycle security system of claim 3, said locking means comprising a plurality of locking pins carried by said support means and located respectively adjacent the front and rear wheels of the bicycle and the central frame portion thereof, said pins, when in their locked position, extending through said front and rear wheels, and through said central frame portion.

5. In the bicycle security system of claim 4, said support means comprising an elongated base adapted to receive the lower portions of the bicycle wheels therein, the pins adjacent to said wheels, when in their locked position, extending from said base on one side of said recess, through said wheels, into an aligned bore located in said base on the opposite side of said recess, said base further having upwardly extending posts on opposite sides of said recess adjacent the central frame of the bicycle, with a locking pin mounted on one of said posts adapted to extend through the central frame of the bicycle into an aligned bore located in said other post.

6. In the bicycle securing system of claim 1, said control means further comprising:
   card reader means for reading information from said bank card, said information including a bank account number and a corresponding personal identification number;
   input means for inputting information to said central processor means;
   telephone modem means for communicating with a bank's computer system; and
   display means for requesting input and displaying output.

7. A bicycle security system comprising:
   an elongated base which is adapted for receiving a bicycle thereon, said base including a recessed tire channel which extends lengthwise along said base and a pair of posts which project upwardly in spaced relation from said base on opposing sides of said tire channel;
   locking means for locking and unlocking said bicycle to said base, said locking means comprising;
   a plurality of locking assemblies which are disposed within said base adjacent to said tire channel so as to lock said bicycle at a frame portion, a front wheel and a rear wheel thereof, each of said locking assemblies comprising;
   housing means for housing said assembly;
   a locking pin slidingly mounted within an open bore which extends into said housing adjacent to said tire channel, said locking assembly including an actuator pin which projects outwardly from said locking pin and protrudes outwardly of said housing through a longitudinal slot in the top of said housing;

a spring-biased locking bolt slidingly mounted within a second bore in said housing which extends perpendicularly from said open bore into said housing;

means for retaining said spring-biased locking bolt within said second bore such that said locking bolt has a retracted position, wherein said locking bolt is retained within said bore, and an extended position wherein said locking bolt is released and is biased upwardly within said bore;

an L-shaped actuator lever having an elongated leg portion with an elongated slot formed therein and a short leg portion, said bracket being pivotally mounted on top of said housing such that said elongated slot communicates with said protruding actuator pin and said actuator lever actuates said locking pin to locked position via said pin and said slot when said lever is pivoted;

rod means connected to said short leg of said actuator lever for actuating said locking pin between an unlocked position, wherein said locking pin is retracted within said housing, and a locked position, wherein said locking pin is extended outwardly of said housing and into an aligned locking bore on the opposing said of said tire channel;

means biasing said locking pin to said unlocked position, said locking assembly being operable for locking when said locking bolt is released and said locking pin is actuated to its said locked position, whereby said locking bolt is biased upwardly into a latching position that blocks the biased return of said locking pin;

said locking assembly being operable for unlocking responsive to the operation of said retaining means to retract said locking bolt back into its said bore; and control means for activating and deactivating said retaining means.

8. The bicycle security system as claimed in claim 7, wherein two of said locking assemblies are mounted within said base so as to lock a front wheel and a rear wheel of said bike, and further wherein a third of said locking assemblies is mounted within one of said posts so as to lock a frame portion of said bicycle.

9. In the bicycle security system as claimed in claim 7, said means for retaining said locking bolt within said bore comprising electromagnetic means.

10. In the bicycle security system as claimed in claim 7, said rod means comprising an actuator pedal and a plurality of interconnected rods connecting said actuator pedal to said locking assemblies for simultaneous actuation of said locking pins.

11. In the bicycle security system as claimed in claim 7, said control means employing a user's bank card to operate said system and debit charges accrued to said user's bank account, said control means being operative for controlling said locking means, tracking time in connection with a user's operation of said system, calculating a charge based on said time of operation of said system, and debiting said charge to said user's bank account.

12. In the bicycle security system as claimed in claim 11, said control means comprising:

card reader means for reading information from said banking card, said information including a bank account number and a corresponding personal identification number (PIN);

central processing means for processing and storing said information, said central processing means including meter means for tracking time in connection with a user's operation of said system;

input means for inputting information to said central processing means;

telephone modem means for communicating with a bank's computer system;

display means for requesting and displaying information;

said control means being operable for controlling said system wherein when said user inserts said banking card into said card reader and inputs said PIN via said input means, said central processing means processes said information to determine the validity of said banking card and said PIN and thereafter, upon determination of validity, stores said information and conditions said locking means for movement to locking position, after which said user places and locks said bicycle in said bicycle rack, and said central processor activates said meter means to track time in connection with said user's operation of said system;

said control means being further operable for controlling said system wherein when said user returns to said system, inserts said banking card into said card reader means, and inputs said PIN via said input means, said central processing means compares said information with said stored information therein and upon verification of a match of said information, deactivates said meter means, calculates a charge based on said time of operation, displays said time and said charge via said display means, unlocks said locking means, and debits said charge to said user's bank account via said modem means.

13. In the bicycle securing system as claimed in claim 11, said control means comprising:

card reader means for reading information from said banking card, said information including a bank account number and a corresponding personal identification number (PIN);

central processing means for processing and storing said information, said central processing means including meter means for tracking time in connection with a user's operation of said system;

input means for inputting information to said central processing means;

telephone modem means for communicating with a bank's computer system; and display means for requesting input and displaying output.

14. A bicycle securing system comprising:

an elongated base including channel means for receiving tires of a bicycle therein and a pair of upwardly extending posts on opposing sides of said channel means adjacent to a central frame portion of the bicycle;

locking means movable between a locked position and an unlocked position for securing said bicycle to said base comprising;

first, second and third locking pins housed within said elongated base and locked respectively adjacent the front and rear wheels and the central frame portion of said bicycle, said first and second pins, when in their locked position, extending from said base on one side of said channel means, through said wheels, and into an aligned bore located in said base on an opposite side of said channel means, said third pin when in said locked position, extending from one of said posts through said central frame portion, and into an aligned bore located in said other post;

biasing means for normally urging said locking pins to said unlocked position;

manually controlled means for simultaneously moving said locking pins to said locking position in opposition to said biasing means; and retaining means for retaining said locking pins in said locked position; and control means for controlling said retaining means.

* * * * *